July 5, 1966   G. W. STROTHER, JR   3,259,738
SCANNING DEVICE
Filed Nov. 15, 1963   3 Sheets-Sheet 1
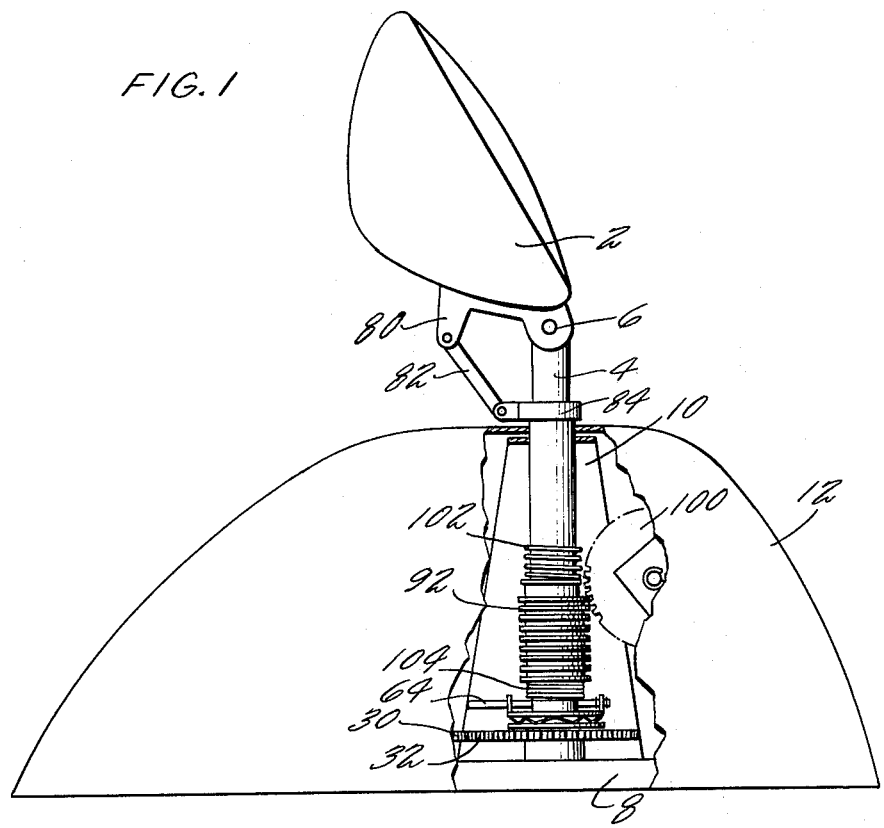
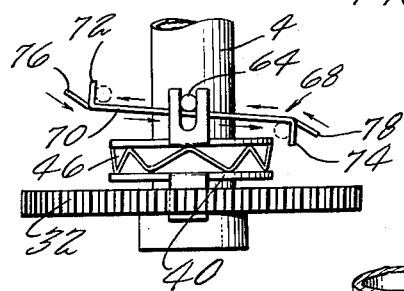
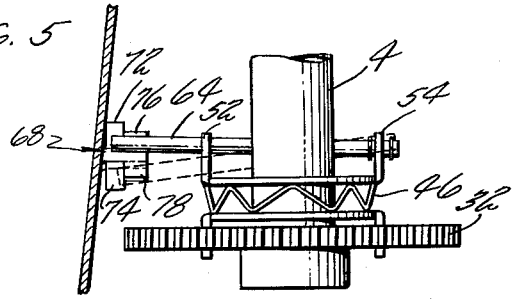
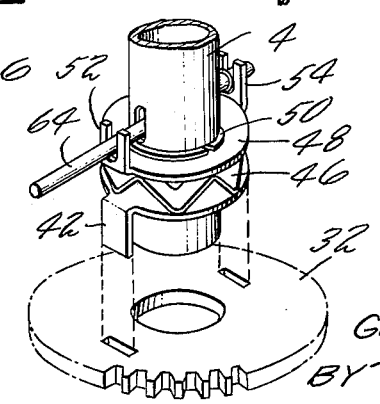
INVENTOR
GEORGE W. STROTHER, JR.
BY Raymond W. Colton
ATTORNEY

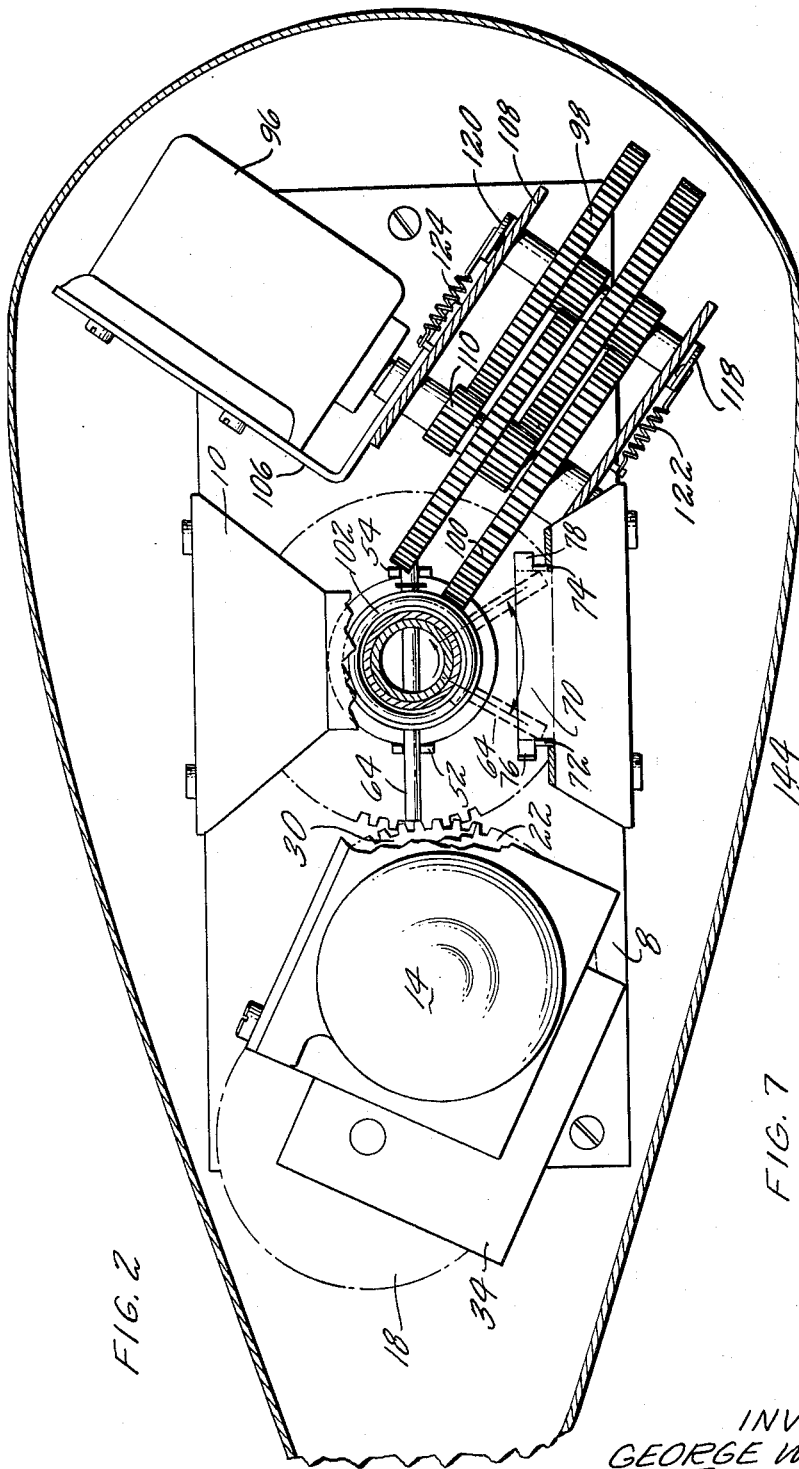

INVENTOR
GEORGE W. STROTHER, JR.
BY Raymond Wootton
ATTORNEY

United States Patent Office 3,259,738
Patented July 5, 1966

3,259,738
SCANNING DEVICE
George W. Strother, Jr., Arlington, Va., assignor to Navionics, Inc., a corporation of Delaware
Filed Nov. 15, 1963, Ser. No. 323,940
10 Claims. (Cl. 240—61.9)

This invention relates to a universally adjustable searchlight and particularly to a remotely controlled searchlight for use, for example, in boats.

One feature of the invention is an inexpensive construction of searchlight and support which is easily manufactured and assembled. Another feature is a motor drive for rotating the light with stops permitting rotation through an angle more than 360° so that the entire horizon may be swept by the light without any blind spots. This arrangement eliminates any excessive twisting of the electric cord leading to the light and eliminates the need for slip rings for the light. More specifically, one feature of the invention is the use of a plurality of fixed stops in a position to be engaged by a single moving stop device on a light rotating structure and so arranged that the stop device will selectively engage the proper fixed stop in each direction of movement. Another feature is a slip clutch in the light rotating mechanism to protect the mechanism when the rotation of the light is stopped and the motor continues to operate.

One feature of the invention is a motor drive for changing the elevation of the light beam so arranged that the light may be rotated without affecting the elevation of the light and with a safety arrangement to prevent damage to the mechanism if the drive motor is not shut off at the end of the travel of the light elevating mechanism. More specifically, one feature of the invention is an arrangement of the drive gear and rack such that the gear will ratchet past the end of the rack at either end of travel of the track. Another feature is a circular rack in the light elevating mechanism to permit the searchlight to be rotated regardless of the position of the elevation changing mechanism.

One feature of the invention is a gear reduction drive between the motor and light with a spring biased gear mounting to facilitate assembly and to minimize backlash in the gears.

The invention is in certain respects an improvement on the spotlight of the Dohrmann Patent 2,754,411 in that rotation of the light on a vertical axis is limited by stop means thereby eliminating the necessity of slip rings or the limit switches shown in this patent.

Other features and advantages will be apparent from the specification and claims, and from the accompanying drawings which illustrate an embodiment of the invention.

FIG. 1 is an elevation of the device with parts broken away to show certain details.

FIG. 2 is a plan view on a larger scale also with parts broken away substantially along the line 2—2 of FIG. 3.

FIG. 4 is a detail of the light rotating mechanism and the stop device.

FIG. 5 is a view at right angles to FIG. 4 showing the stop ramp in detail.

FIG. 6 is a perspective view showing the slip clutch.

FIG. 7 is a circuit diagram.

Figure 3:
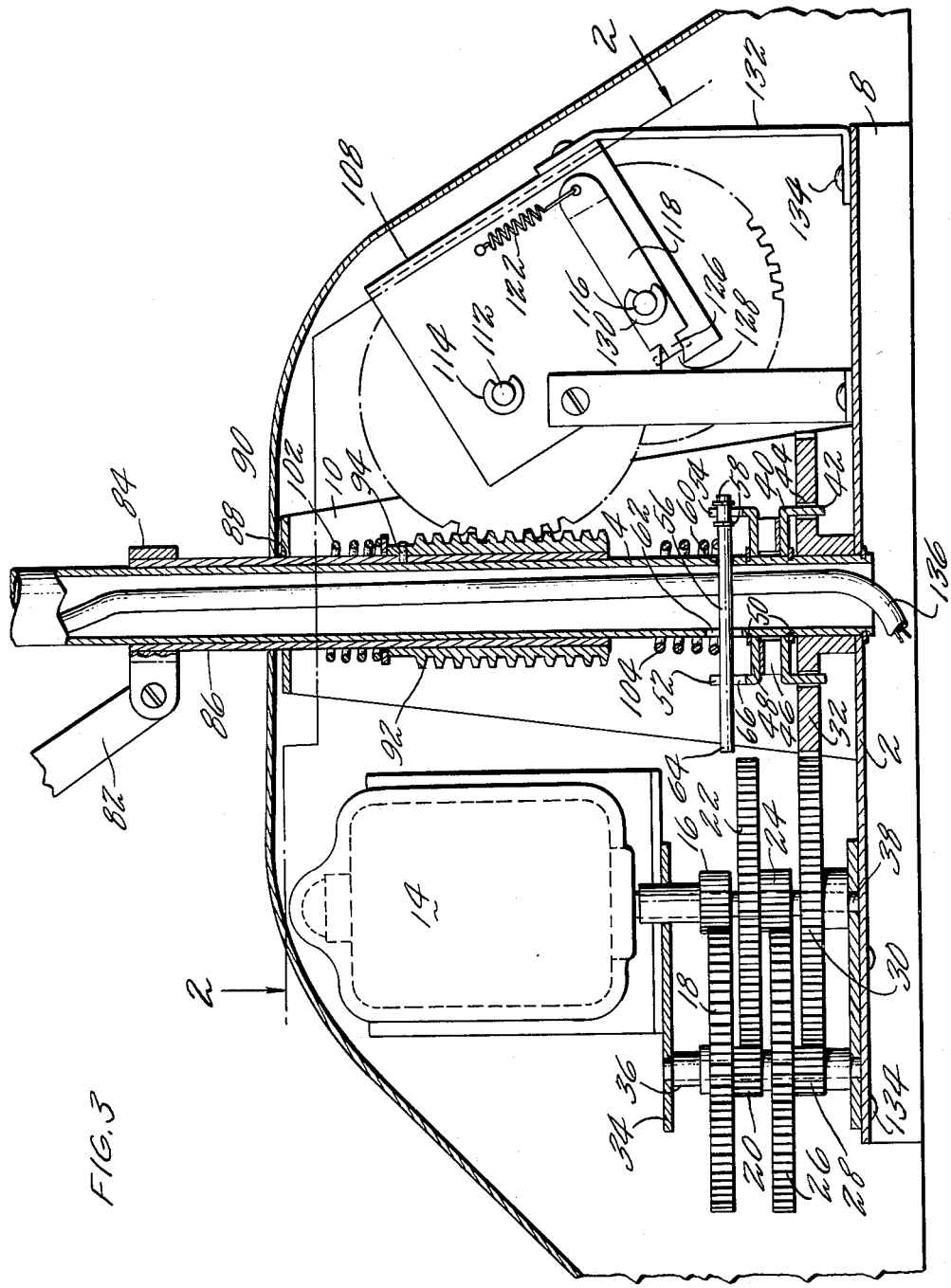
FIG. 3 is an elevational view with parts of the device shown broken away.

With reference first to FIG. 1, the searchlight 2 is mounted on the upper end of a vertical supporting shaft or tube 4 being pivoted on a horizontal pin 6. The shaft 4 is supported at its lower end in a sheet metal base 8 and an inverted U-shaped center support 10, described in greater detail later, providing a support for the shaft 4 adjacent the upper end. The support 10 has the legs of the U attached to the base 8 and the flat upper end of the support surrounds the shaft 4. The entire device may be covered by a casing 12 to protect the mechanism from the elements.

The tube is rotated about its axis to turn the searchlight 2 on a vertical axis by means of a motor 14 which drives a pinion 16 and a train of gears including gear 18 and integral pinion 20, gear 22 and integral pinion 24, gear 26 and integral pinion 28 and a large gear 30. Gear 30 meshes with a gear 32 mounted on the lower end of the tube 4, FIG. 3, but free to turn thereon. The gear train is carried in a sheet metal U-shaped bracket 34 having spaced shafts 36 and 38 on which the gear train is mounted. Suitable snap rings or other spacing devices may be utilized to hold the respective gears in spaced relation. It will be obvious that the pinion 16 is mounted on and turns with the motor shaft. The shaft 38 may be an extension of the motor shaft but is preferably a fixed shaft, the upper end of which is received within the lower end of the motor shaft.

The slip clutch through which the gear train drives the shaft or tube 4 consists of a lower disc 40 having downwardly extending prongs 42 received in openings 44 in the gear 32. A wave spring 46 is positioned between the disc 40 and an upper disc 48. The two discs 40 and 48 are held in fixed relation to each other and with the spring 46 under compression by snap rings 50 engaging the shaft.

The washer 48 has upwardly extending lugs 52 and 54 which receive a horizontally extending stop pin 56 projecting through the shaft 4. The stop pin is held against endwise movement by snap rings 58 on opposite sides of the lug 54 which is slotted to receive the pin. The opening 60 in one side of the hollow shaft 4 to receive the pin is substantially the dimension of the pin to serve effectively as a pivot at this point. At the opposite side of the shaft 4 a vertical slot 62 permits a limited amount of vertical movement of the stop engaging end 64 of the pin. The lug 52 has a vertical slot 66 therein to guide the pin for vertical movement. It will be apparent that when the motor 14 is operating, the gear train will drive through the cooperating discs and wave spring 46 to turn the pin 56 and thereby rotate the shaft 4 carrying with it the searchlight.

The center support 10 which is preferably of sheet metal for ease of manufacture, has pressed out from one of the vertical parts thereof the fixed stop mechanism 68, FIGS. 4 and 5.

The device 68 consists of a central ramp section 70 extending at a slight angle to the horizontal and having at its higher end an upwardly-extending substantially-vertical stop 72 and at its opposite lower end a downwardly-extending substantially-vertical stop 74. Adjacent to the stop 72 is a pin guide 76 which extends upwardly from the end of the ramp 70 at a somewhat steeper angle than the ramp itself for guiding the pin onto the underside of the ramp. Similarly, at the lower end of the ramp is a pin guide 78 extending downwardly at a somewhat steeper angle than that of the ramp for guiding the pin onto the upper surface of the ramp.

In operation, as the searchlight rotates in a clockwise direction, as seen in FIG. 2, the outer end 64 of the stop pin engages with the pin guide 78 and is carried onto the upper surface of the ramp until the pin engages the vertical stop 72. At this point, further rotation of the vertical tube or shaft is prevented and the slip clutch permits the motor 14 to contine its rotation. As the pin rides up the ramp it moves vertically in the slots 62 and 66. Upon reversal of the motor so that the shaft 4 is rotated counterclockwise, FIG. 2, when the counterclockwise rotation is approximately 360° from the point where clockwise rotation was terminated, the end of the stop pin engages the pin guide 76 so that it is carried onto and rides down on the underside of the ramp into engagement with the pin stop 74. It will thus be seen that rotation of the searchlight is greater than 360° by the amount of the angle represented by the two positions of the pin in FIG. 2.

In addition to the rotation of the searchlight about the vertical axis of the shaft 4, the light may be pivoted about the horizontal hinge pin 6. To accomplish this, a lug 80 on the searchlight is connected by a link 82 to a collar 84 on the upper end of a sleeve 86 surrounding the shaft 4. This outer sleeve fits within an opening 88 in the flat upper end of the center support 10 and thereby serves to support the shaft 4 at this point.

The outer sleeve 86 has a circular rack 92 fixed thereon as by a pin 94 such that the sleeve and rack move in unison. Vertical movement of the rack 92 is obtained from a motor 96, FIG. 2, driving through a gear train 98 similar to the gear train previously described. The last gear 100 of the gear train is in mesh with the circular rack 92 and by selectively controlling the direction of rotation of the motor 96, the rack 92 may be moved vertically and thereby change the angle of the beam of the searchlight. Surrounding the sleeve 86 above the rack is a compression spring 102 which is compressed as the rack reaches the end of its travel in the upper direction and a similar spring 104 located below the rack is compressed as the rack reaches its downward limit of travel. The length of the rack 92 is so selected that the rack will move out of engagement with the cooperating gear 100 as the rack reaches the end of travel so that with continued turning of the gear 100 the teeth of the latter will ratchet past the end of the rack. If the motor is reversed, the spring which has been compressed will urge the rack into meshing engagement with the gear in readiness of movement of the rack in the opposite direction.

The motor 96 is mounted on a sheet metal bracket 106 which in turn is attached to a U-shaped sheet metal bracket 108 which supports the gear train. It will be understood that the pinion 110 is attached to the motor shaft to rotate therewith for driving the remainder of the gear train. For ease in assembly of the gear train, the shaft 112 which is in alignment with the motor shaft is journalled in the bracket, the latter forming a journal for the shaft with a snap ring 114 locating the shaft in position. The other shaft 116 which carries certain of the gears of the gear train instead of being mounted directly in the bracket 108 is carried by pivotally mounted levers 118 and 120 which are urged by springs 122 and 124 in a direction to move the shaft 116 toward the shaft 112 thereby to minimize any backlash in the gear assembly.

For simplicity of manufacture, the levers are similar and only one will be described in detail. The lever 118 has a projecting tab 126 at the end remote from the associated spring 122 and this tab fits in a notch 128 in the bracket 108. This notch is cut at such a slant that the pivoting of the lever 118 by the spring 122 urges the tab 126 into the base of the notch. By providing a slot 130 surrounding the shaft 116 in the bracket 108, the shaft can move within the bracket 108 under the influence of the spring 122. Since the other lever 120 is similar, the associated spring 124 at the other end of the shaft exerts the same pull with the levers 118 and 120 pivoting on the respective tabs.

The bracket 108 may be supported above the base 8 by a formed piece of sheet metal 132 attached to the base. The several brackets and parts of the assembly may be held in associated relation, one to another by suitable screws 134 which, for example, permit easy assembly of the device. It will be understood that the electrical supply to the searchlight may be provided by a conventional electric cord 136 since the stop device, above described, prevents the searchlight from rotating far enough to twist cord detrimentally.

With reference to FIG. 7, which shows a circuit diagram, the power is supplied by two leads 138 and the bulb 140 in the searchlight is positioned between these leads with a suitable on-off switch 142. The motor 14 is also positioned between the two supply leads but is so controlled by a double-throw switch 144 that the direction of rotation of the motor 14 may be reversed as will be clearly apparent from this figure. Similarly, the motor 96 is connected through a double-throw switch 146 to the respective supply leads so that with the switch moved to the left of the mid-position shown the motor 96 will rotate in one direction and with the switch moved to the right from the position shown the motor will rotate in the opposite direction.

It is to be understood that the invention is not limited to the specific embodiment herein illustrated and described, but may be used in other ways without departure from its spirit as defined by the following claims.

I claim:

1. A remotely controlled searchlight assembly, including a base, a turnable shaft on said base, a searchlight carried by said shaft, means for turning said shaft on the base and thereby turning the searchlight on a substantially vertical axis, slip clutch means between said shaft and turning means and clutch actuating means including interacting cam and follower means carried by said base and shaft for disengaging said clutch and limiting the turning movement of said support to an arc substantially greater than 360°.

2. An assembly as in claim 1 in which said follower means includes a lateral projection on the turntable shaft, spaced fixed stops on the base, and said cam means is disposed between the stops for directing the lateral projection into alignment with the appropriate stop.

3. An assembly as in claim 1 in which the turning means includes a driving motor.

4. A searchlight assembly as in claim 1 in which the base has an upward projecting support engaging with the turnable shaft adjacent its upper end and in which the spaced stops are carried by said support.

5. An assembly as in claim 4 in which the upward projection is sheet metal and the spaced stop and ramp means are pressed out of the sheet metal.

6. A remotely controlled searchlight assembly including a base, a turnable shaft on said base, a searchlight assembly horizontally pivoted on said shaft and means for tilting the searchlight to control the elevation of the beam thereof, including a sleeve surrounding the shaft and slidable thereon, a link connecting said sleeve to the searchlight and means including a circular rack on the sleeve for moving said sleeve and thereby the searchlight said rack being driven by a gear train including a gear in mesh with said rack, said rack being shorter than the length of the travel of the sleeve so that the rack moves out of mesh with the gear at the end of the travel of the sleeve and the latter ratchets past the end of the rack as the gear continues to rotate.

7. An assembly as in claim 6 in which a compression spring at the end of the rack is compressed as the rack reaches the end of its travel for holding the rack in engagement with the gear teeth.

8. An assembly as in claim 6 in which a compression spring at each end of the rack is compressed as the rack reaches the end of its travel in either direction for holding the rack in engagement with the gear teeth at both ends of the travel of the rack.

9. A remotely controlled searchlight assembly having a base, a turnable shaft carried by said base, a search-light horizontally pivoted on the upper end of the shaft, a sleeve surrounding the shaft and connected by a link to the searchlight for changing the elevation thereof, a circular rack having annular teeth and rotatable with said sleeve, a gear train including gear means engaging said rack, a motor for driving said gear train, a second motor for driving the shaft and a second gear train from said second motor to said second shaft, one of said gear trains including a plurality of gears on each of a pair of parallel shafts with gears on the parallel shafts in mesh with one another and spring means for urging said parallel shafts toward each other to hold the gears in tight engagement for minimizing backlash.

10. An assembly as in claim 9 in which one of the parallel shafts is carried by pivoted links and the spring means urges the links in a direction to hold the gears in engagement.

References Cited by the Examiner
UNITED STATES PATENTS

| | | | |
|---|---|---|---|
| 1,284,818 | 11/1918 | Toepfer | 240—61.6 |
| 2,267,974 | 12/1941 | Harley | 240—7.7 |
| 2,397,777 | 4/1946 | Colman | 74—409 |
| 2,746,573 | 5/1956 | Hastings | 74—10.2 |
| 2,754,411 | 7/1956 | Dohrmann | 240—61.9 |

NORTON ANSHER, *Primary Examiner.*

EVON C. BLUNK, *Examiner.*

C. R. RHODES, *Assistant Examiner.*